United States Patent [19]

Seymour

[11] 3,765,859

[45] Oct. 16, 1973

[54] METHOD OF LIQUID QUENCHING GLASS SHEETS

[75] Inventor: Samuel L. Seymour, Oakmont, Pa.

[73] Assignee: PPG Industries, Inc., Pittsburgh, Pa.

[22] Filed: May 15, 1972

[21] Appl. No.: 253,354

Related U.S. Application Data

[63] Continuation-in-part of Ser. No. 171,324, Aug. 12, 1971, abandoned.

[52] U.S. Cl............................. 65/114, 65/104, 65/115, 65/116
[51] Int. Cl............................................. C03b 27/00
[58] Field of Search...................... 65/104, 116, 114, 65/115, 60

[56] References Cited
UNITED STATES PATENTS
2,194,611  3/1940  Paddock et al.................. 65/114 X
2,198,739  4/1940  Phillips................................ 65/116

FOREIGN PATENTS OR APPLICATIONS
1,446,244  9/1965  France................................ 65/116

Primary Examiner—Arthur D. Kellogg
Attorney—Russell A. Eberly

[57] ABSTRACT

An improved method of quenching heated flat glass is described which involves applying to a surface on or adjacent at least one peripheral edge of the glass prior to heating it, an edge protecting composition taken from the class of compositions having a low coefficient of expansion compared to glass and/or a heat transfer coefficient not greater than glass while maintaining the major surfaces inwardly of each of said surfaces on or adjacent said peripheral edge substantially free of said protective composition. The glass with its edge so treated is then heated to above its strain point and below its softening point (at which temperature range said composition fuses to the glass) and subsequently quenched using a liquid medium having a high heat transfer coefficient.

15 Claims, No Drawings

METHOD OF LIQUID QUENCHING GLASS SHEETS

RELATION TO OTHER APPLICATIONS

This application is a continuation-in-part of copending patent application Ser. No. 171,324, of Samuel L. Seymour, filed Aug. 12, 1971, for IMPROVED METHOD OF LIQUID QUENCHING, now abandoned.

BACKGROUND OF THE INVENTION

The tempering of glass is typically accomplished by heating glass to an elevated temperature (a temperature above the glass stain point) and then suddenly chilling the glass to cool the glass surface rapidly while the interior regions of the glass cool at a slower rate. This differential cooling pattern of the glass being tempered results in the development of a compressive stress in the glass surface and a tensile stress in the interior regions of the glass. The resultant tempered glass has a much greater resistance to fracture than does umtempered glass. Further, glass which has been tempered and does fracture has a breakage pattern which is significantly different from that of untempered glass in that it shatters into small fragments with blunt rounded edges rather than large sharp-edged pieces which result when umtempered glass fractures. Tempered glass because of its desirable qualities on breakage has an obvious advantage over untempered glass, rendering it particularly useful in transparent doors, motor vehicle closures, ophthalmic lenses and the like.

Glass has been tempered by applying cool air to the surface of heated glass and has been found satisfactory for this purpose especially on glass of considerable thickness (⅛ inch or more). Cool air tempering has not been found as acceptable in cooling thinner glass (below ⅛ inch in thickness) in that only low degrees of temper have often been obtained.

It has been suggested in the prior art to replace air or gas as a cooling medium and to use instead liquids. Liquids, becuase of their superior heat transfer characteristics compared to air, should remove heat much more rapidly from glass surfaces than air. More rapid cooling will set up a greater differential cooling pattern between the interior and the surfaces of the glass cooled, thus creating the potential for the attaining of a higher degree of temper in the glass than possible with air tempering.

Using liquids instead of air to thermally temper glass sheet is generally referred to in the art as liquid quenching. In liquid quenching, rapid cooling of the glass is accomplished by contacting the surface of the glass with a liquid quenchant. Contacting the surface of the glass can be accomplished by various techniques, such as flowing a quenching liquid over the surface of the glass. This is known as "flood quenching" and is described in U. S. Pat. application Ser. No. 108,661, filed Jan. 21, 1971. Another method of contact is "spray quenching," which involves atomizing the quenching liquid into discrete liquid droplets and then spraying the surface of the glass. "Spray quenching" is well known in the metal tempering art and is disclosed, for example, in U. S. Pat. No. 3,208,742. Another method of contact is to immerse the glass sheet completely in the quenching liquid. This technique is referred to in the art as immersion quenching or dip quenching and is described in U. S. Pat. Nos. 170,339, 2,145,119, 2,198,739, 3,186,816, 3,271,207 and Belgian Pat. No. 729,055.

Although liquid quenching has been found to be moderately effective with rather thick glass sheets, it has not been very effective in tempering thinner glass specimens. Often the thinner glass fractures when the sheet is initially contacted with the quenching liquid. The fracture appears to initiate at the edge of the sheet, continues into the body of the glass resulting in total breakage of the sheet.

One of the more important causes of fracturing of thin glass sheets in liquid quenching processes is believed to be due to the fact that the edges of the glass cool at too rapid a rate when compared with the remainder of the glass sheet. In accomplishing a liquid quench by dipping a glass sheet into a liquid quenching bath, this rapid cooling of glass edges is magnified at the "leading edge" of the glass, i.e., the edge of the glass which first contacts the liquid quenching fluid. This differential cooling is referred to as the leading edge effect. Thus, in dip quenching, this differential rate of cooling between the leading edge and the remainder of the glass sheet puts the leading edge temporarily in a tension stress greater than the tensile strength of the glass, which may cause fracture due to the thermal shock of dip quenching.

The leading edge cools at a greater rate than the remainder of the glass sheet because the leading edge dissipates heat by more mechanisms than does the remainder of the glass sheet. The leading edge dissipates heat not only because of the temperature differential between it and the quenching liquid, but also dissipates heat due to the hydrodynamic phenomena caused by liquid flow over the leading edge. This hydrodynamic flow of the quenching liquid over the leading edge as the glass sheet passes through the quenching liquid on immersion removes tremendous quantities of heat at a rapid rate from the leading edge. Thus, a situation is created where a relatively small area of the glass, that is the leading edge, is cooled at a much faster rate than is the remainder of the glass. This difference in the rate of cooling puts the leading edge in tension, in which condition it is particularly susceptible to thermal shock and breakage.

In accordance with this invention a technique is provided for thermally tempering glass by liquid quenching, which minimizes the problems of premature edge cooling and resultant glass fracturing.

SUMMARY OF THE INVENTION

In accordance with the instant invention glass which is to be tempered is treated on at least one of the edge surfaces by applying thereto, prior to heating the glass above its strain point, an edge protective composition having a low coefficient of expansion compared to the coefficient of expansion of glass and/or a heat transfer coefficient not greater than glass. The terms edge surface and edge surfaces as used in the following description refer to the peripheral edge of a glass sheet and narrow areas of either major surface adjacent a peripheral edge of the glass sheet. The edge-treated glass is then heated to an elevated temperature (above the strain point of the particular glass composition and near but below its softening point). At this elevated temperature range, the edge protective composition melts and fuses to the edge surface to form a protective edge coating. The hot glass is then cooled rapidly by contacting it with a liquid quenching medium having a high heat transfer coefficient to impart a high degree of temper to the glass.

DETAILED INVENTION

The compositions utilized in preparing one or more edge surfaces of the glass to be tempered by liquid cooling in accordance with one embodiment of this invention, have a thermal coefficient of expansion less than the glass on which they are placed. Thus they typically have a thermal coefficient of expansion on the order of $7.6 \times 10^{-6}$ inches per linear inch per degree Centigrade ($\alpha 7.6 \times 10^{-6}/°C.$), preferably $6.8 \times 10^{-6}$ inches per linear inch per degree Centigrade or less ($\alpha 6.8 \times 10^{-6}/°C.$) measured at 0° to 300° Centigrade. These compositions can be clear in appearance or can be colored. Typically the compositions contain silica, alumina, lithium, lead and boron. In the colored compositions the frits typically contain cobalt, chromium or mixtures thereof in addition to the above. In general the compositions contain lead in concentrations of 45 to 52 percent by weight as lead oxide, silica as silicon dioxide at weight percents between 33 to 37 percent by weight, alumina as aluminum oxide at weight percent of from 3 to 4 percent, lithium as lithium oxide at 3 to 4 percent by weight, boron as boron oxide at 4 to 5 percent by weight, chromic oxide in a range of 0.5 to 1 percent by weight and cobalt as cobaltous oxide ($Co_3O_4$) in a range of 1 to 2 percent by weight. The preferred frit compositions contain little or no alkali metal other than lithium (less than 0.5 percent by weight) but typically contain lithium oxide in quantities of at least 3 percent by weight of the frit composition. Similarly the preferred frit compositions contain lead measured as lead oxide in a quantity of at least 45 percent by weight. In some instances frits containing little or no lithium can be employed. In general frits of this character having a low thermal coefficient of expansion, contain large amounts of aluminum oxide 38 to 42 percent, typically 40 to 41 percent, and lead oxide in the range of 33 to 36 percent. The silica content of such frits is usually 16 to 20 percent. The remainder of such a frit is composed of material such as chromium oxide and/or cobaltous oxide in the range of 3 to 5 percent.

According to another embodiment of the present invention, a composition having a heat transfer coefficient not greater than that of glass is applied to the portion of the edge surface to be protected. Typical heat insulating compositions of this other embodiment are pastes or cements whose heat transfer coefficients do not exceed that of glass. Since glass has a heat transfer coefficient of 0.002 calories per second per square centimeter of area per centimeter of thickness per degree Centigrade, any material that does not react chemically with glass or decompose when subjected to the thermal treatment involved in tempering glass and whose heat transfer coefficient does not exceed that of glass, meets the requirements of this latter embodiment. Examples of suitable materials to be included as components of compositions fulfilling the requirements of the latter embodiment include dispersions or pastes of one or more pulverulent material such as lime, magnesia, magnesium carbonate, mica, calcium sulfate, silica, chalk, diatomaceous earth, lamp black and cerium oxide. Certain high silica content cements, such as those available commercially as Sauereisen No. 1 cement paste and Sauereisen No. 8 cement, for example, are especially suitable.

Edge protecting compositions having the characteristics of both embodiments of this invention are especially preferred.

The frit is applied to the glass in any convenient manner. Typically the frit is carried in an organic medium, rending the composition capable of being brushed onto the glass surfaces to be coated. Any organic medium which will thermally decompose at the temperature employed in heating the glass above its strain point and in which the frit can be dispersed may be used. Thus, material such as pine oil, crude oil, alcohols ethers, benzene, terpentine, chlorinated solvents such as chloroform, methyl chloroform, ethylene dichloride, carbon tetrachloride, and other similar materials are suitable. The frit is typically sized to provide that the particles are below 200 mesh in size and preferably 90 percent or more of the glass frit is below 325 mesh (U. S. Sieve Series). If desired, viscosity modifiers can be used to render the carrier more viscous. Utilization of brushes, rollers and other mechanical methods of applying the frit in the carrier vehicle are contemplated in placing the frit on the glass edge surfaces.

After application of the frit composition to the edge surfaces of the glass, the glass is first heated to an elevated temperature, usually somewhere near the softening point of the particular glass being tempered. The softening point, as used herein, is that condition in which glass has a viscosity of $10^{7.6}$ poises. The temperature at the softening point of the glass will vary depending on the particualr composition of the glass. For example, in a soda-lime-silica glass composition, the temperature at the softening point is about 1400°F. In a borosilica glass composition this temperature is about 1500°F.

When the glass has been heated to the above-described elevated temperature, it is immediately contacted with a liqud quenching agent where heat is exchanged between the surface of the glass and the liquid. A direct measure of this heat exchange is the heat transfer coefficient. The heat transfer coefficient is defined as the heat flux at the glass-liquid interface between the heated, immersed glass body and the surrounding liquid per unit of temperature difference-unit of time-unit of glass surface. For the purposes of this invention, the heat transfer coefficient is expressed as British Thermal Units/hour-square foot-degree Fahrenheit (B.T.U./hr.-ft.²-°F.).

In tempering the treated glass articles, the quenching liquid preferably is one which provides a relatively high average heat transfer coefficient over the entire range of temperature employed in the tempering process. With thin glass, heat exchange between the interior of the glass and the surface is appreciably more rapid than with thicker glass. Therefore, in order to achieve as high a degree of temper in thin glass as is obtainable with thicker glass, the heat flux at the glass-liquid interface must be proportionally greater for thin glass than for thicker glass. One way of providing a greater heat flux at the glass-liquid interface is to quench in a liquid providing a relatively high average heat transfer coefficient over the entire temperature range employed in the tempering process.

It has been found in the practice of this invention in tempering glass previously treated on one or more edge surfaces with frit having a low thermal coefficient of expansion by a liquid-quenching technique, that the quenching should be accomplished in liquids which have an average heat transfer coefficient of at least 125 B.T.U./hr.-ft.$^2$-°F., preferably within the range of 200 to 500 B.T.U./hr.-ft.$^2$-°F. as the glass is cooled through the temperature range used in the tempering process. The temperature range used in the tempering process is defined as the surface temperature of the glass near its softening point down to a lower surface temperature at which the interior of the glass has cooled through the glass strain point. The glass strain point as used herein is that condition in which glass has a viscosity of $10^{14.6}$ poises. When glass has been cooled completely through the strain point, the final degree of temper in the glass has been attained.

In tempering thinner glass, i.e., glass of about 0.050 to 0.090 inch in thickness, to obtain a high degree of temper, quenching liquids should be used which provide an average heat transfer coefficient in the upper ranges of the limits set forth. With thicker glass, i.e., glass of about 0.100 to 0.500 inch in thickness, a high degree of temper can be obtained using liquids which provide average heat transfer coefficients in the lower ranges of the limit set forth.

Besides quenching with liquids which provide an average heat transfer coefficient at the glass-liquid interface within the above-specified limits, it is also important that the quenching liquid provide a relatively high actual heat transfer coefficient as the glass is cooled through the lower temperature regions of the tempering process. These lower temperature regions are defined as the range of glass surface temperatures from near its strain point down to a lower surface temperature when the interior regions of the glass pass through the strain point.

In the practice of this invention, it has been found in tempering the edge treated glass that the actual heat transfer coefficient at the glass-liquid interface should not fall off too quickly as the glass is cooled down through the lower temperature regions of the process. Accordingly, the heat transfer coefficient should be always at least 125, generally 125 to 600, and preferably 200 to 500 B.T.U./hr.-ft.$^2$-°F. as the glass surface is cooled from a temperature near its strain point down to a lower surface temperature at which the center of the glass has cooled to a temperature below the strain point. As an example, with soda-lime-silicate glass, the temperature of the glass surface at the stain point is typically about 960°F. The lower temperature, i.e., the surface temperature of the glass at which the center of the glass has cooled to a temperature below the strain point is more difficult to pin down and will depend upon, among other things, the thickness of the glass, the composition of the glass, and the heat flux at the glass-liquid interface. For soda-lime-silica glass having a thickness of about 0.050 to 0.125 inch with a heat transfer coefficient at the glass-liquid interface which will provide for a high degree of temper in the resultant glass article, the lower temperature of the surface of the glass will be about 500°-600°F.

Examples of liquid-quenching agents useful in the practice of this invention are the polyoxyalkylene glycols, such as polyoxyethylene glycols, polyoxypropylene glycols or mixtures thereof (polyglycols).

Polyoxyethylene glycols, HO-CH$_2$-CH$_2$(OCH$_2$-CH$_2$)$_n$OH, n = 1 to 1000, range at room temperature from water-white liquids to waxy solids. Those above 1000 in molecular weight are sold commercially under trademark CARBOWAX. Although pure polyoxyethylene glycols can be prepared and can be used in the practice of this invention, the commercially available compounds are actually mixtures of a number of polyoxyethylene glycol polymers of various molecular weights. The commercially available polyoxyethylene glycols up to a molecular weight of about 700 are water-white liquids at room temperature. Those having molecular weights of 1000 or above are solids that vary in consistency at room temperature from a petrolatum-like grease to a hard wax. If these higher molecular weight polyoxyethylene glycols are used as the quenching liquids in the practice of this invention, they should first be heated to above their melting point to convert them to a liquid before use. The polyoxyethylene glycols are typically prepared by an alkali catalyzed condensation of ethylene oxide in water:

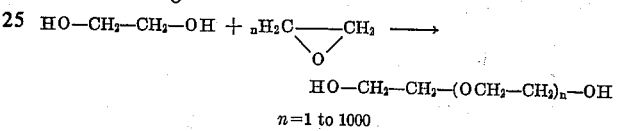

$n = 1$ to 1000

Polyoxypropylene glycols HO—(C$_3$H$_6$—O)$_n$—C$_3$H$_6$—OH, $n$ = 1 to 1000, are colorless to light yellow viscous liquids. They are commercially available to molecular weights ranging from approximately 400 to 2,000. They are manufactured by the polymerization of propylene oxide in the presence of an acid or alkaline catalyst. The procedure is similar to that used in the preparation of polyoxyethylene glycols. The low molecular weight polyoxypropylene glycols, i.e., up to a molecular weight of 500, are completely water soluble, while those of higher molecular weight, i.e., from 1,000 to 2,000, are only slightly soluble in water. Those having an intermediate molecular weight, i.e., from 600 to 900, are moderately soluble in water, about 10 to 20 percent at room temperature. For the practice of this invention, the partially and completely water soluble polyoxypropylene glycols are preferred. Polyoxypropylene glycols are commercially available under the trademark NIAX.

Mixed polyoxyethylene-polyoxypropylene glycols are hydroxy-terminated copolymers of ehtylene oxide and propylene oxide. These mixed glycols range from mobile to very viscous liquids with molecular weights as high as 40,000. Either water-soluble or water-insoluble products can be prepared, although water-soluble products are preferred in the practice of this invention. Mixed polyoxyethylene-polyoxypropylene glycols are sold commercially under the trademark UCON.

Other liquids which can be utilized in the instant process are silicone fluids and hydrocarbon oils.

The silicone fluids of the invention are dialkyl, diaryl or alkyl-aryl fluids. The fluids are linear polymers of alternating silicon and oxygen atoms, each silicon atom having two organic groups attached to it. The chemical formula for the silicone fluids is:

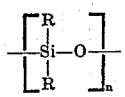

where n varies from 9 to 100, and R is selected from alkyl and/or aryl groups. R can be selected from lower alkyl groups having 1 to 4 carbon atoms. When R is methyl, the above formula depicts the familiar dimethyl silicone fluids. Also R can be selected from aryl groups, especially phenyl groups and alkyl and halo substituted phenyl groups. The incorporation of phenyl groups into the polysiloxane polymer backbone increases the oxidative stability of the fluid. The larger the value of $n$ in the above formula, the higher the molecular weight and the higher the viscosity is in the resulting silicone fluid. In the practice of this invention, silicone fluids having a molecular weight of from about 675 to 11,000 and a viscosity of from about 5 to 200 centistokes at 77°F. are contemplated.

Silicone fluids are sold commercially under the tradenames Dow Corning Silicone Fluids and General Electric SF. Silicone fluids are well known in the art and are described in *An Introduction to the Chemistry of the Silicones*, 2nd Edition, by E. G. Rockow, Wiley, New York 1951.

One method of preparing the silicone fluids useful in the invention is to hydrolyze in an acidic-aqueous medium dialkyl, diaryl and/or alkyl, -aryl dichlorosilanes,

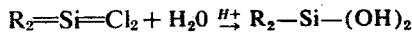

wherein R = alkyl and/or aryl. The silane diol is unstable and self-condenses to a polysiloxane, or what is commonly known as the silicone fluid.

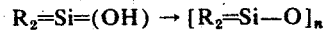

wherein R = alkyl and/or aryl and $n$ = 9 to about 100.

To prepare low molecular weight or low viscosity products a trialkyl-silane such as trimethyl chlorosilane can be added as an end blocker. Thus, for example, if two moles of trimethyl chlorosilane are added for each mole of dimethyldichlorosilane, the following reaction occurs:

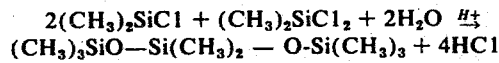

Reduction of the amount of trialkyl silane allows, of course, the formation of higher molecular weight compounds. This end blocking technique is an effective way to control viscosity and also serves to stabilize the viscosity of the silicone fluid against further polymerization upon standing.

The hydrocarbon oils useful in the practice of this invention are the so-called heat treating oils which are will known in the art of metal tempering. Such oils are mineral oils which are obtained from coking operations or petroleum refining. The oils are characterized in that they have low volatility, have resistance to high-temperature, have resistance to oxidation, and have a high flash point. More specifically, the mineral oils useful in the practice of this invention should have a boiling range from about 400° to 800°F.; a flash point from above about 300° to 500°F. and a SUS viscosity within the range of from about 100 to 2500 seconds at 100°F. If the mineral oils used are petroleum derivatives, they may be paraffinic base aromatic base, i.e., naphthenic or mixed base oils. Present in the mineral oil, of course, can be various additives such as anti-oxidants, emulsifiers, thermal stabilizers, viscosity modifiers, surfactants and the like. Such mineral oils are well known in the art of metal tempering and are further described in detail in *Metalworking Lubricants; Their Selection, Application and Maintenance*, by E. L. Bastian, McGraw-Hill, New York 1951 and *Lubricants and Cutting Oils for Machine Tools* by W. G. Forbes, Wiley, New York 1943.

The liquid quenching mediums of this invention should be essentially water free. By essentially water free is meant that the quenching medium contain less than 5 percent by weight water. If greater amounts of water are present, there will be an increased tendency for the glass sheet to fracture during the tempering operations. This problem is particularly serious with thinner glass sheets, i.e., sheets having a thickness of about 0.050 to 0.090 inch. Although not intending to be bound by any specific theory, it is believed that water forms a vapor blanket around the glass sheet, when the glass sheet is initially contacted with quenching medium. This vapor blanket acts as an insulating barrier and inhibits heat flux at the glass-liquid interface, heat being removed principally by radiation through the vapor film. Thus, the glass is initially cooled very slowly and very little potential for temper is developed. Eventually enough heat will be removed by radiation such that the glass has cooled to a temperature near its strain point. This is a temperature at which the glass ceases to behave as a viscous liquid and starts behaving as an elastic solid. At about this temperature, the vapor blanket is no longer stable and the water comes in direct contact with the glass surface and violent boiling ensues. Heat is removed from the surface of the glass as latent heat of vaporization at a very rapid rate. However, since the glass surface is starting to behave as a solid, it cannot withstand this rapid heat flux and as a result the glass shatters.

The liquid quenching media of the instant invention can contain various additives, such as viscosity modifiers, suspension and emulsion stabilizers, wetting agents, detergents, anti-oxidants and thermal stabilizers. Examples of such additives include carboxy methyl cellulose, sodium alkyl sulfonate, sodium dioctyl sulfo-succinate and tert-butyl catechol.

In utilizing the liquid quenching baths of the instant invention temperature of the bath can vary considerably. Thus, bath temperatures may be ambient (70°F.) or they may be above or below ambient temperatures. Typically the temperatures range between 50°F. to 450°C. It has been found with larger glass pieces that heating the quenching liquids in the range of 200°F. to 450°F. produces considerably less breakage than temperatures below this range. The upper practical limit on the temperature used is usually the flash point of the particular quenching liquid or blend of quenching liquids used.

The various liquid quenching fluids may be utilized alone or may be blended with one or more liquids to provide the liquid quenching fluid to be employed.

The glass which is tempered according to the method of this invention is typically a silica-type of flat glass, particularly soda-lime-silica glass, lead-silica glass and borosilica glass. The nature and production of silica glasses is well known in the art, and generally is described in the *Encyclopedia of Chemical Technology*, by Kirk-Othmer, published by Interscience Encyclopedia In., New York, N. Y. volume 7, pages 181-189. The method of the invention has been found to be particularly useful in the tempering of thinner glass sheets, i.e., glass sheets having a thickness of about 0.050 to 0.125 inch. The method of the invention is generally applicable to tempering glass sheets of from 0.050 to 1 inch or more in thickness.

The geometric configuration of the glass treated in accordance with this invention is not particularly critical in that flat-glass sheets and curved-glass sheets, for example, curved-glass windshields, may be tempered using the quenching fluids hereinabove described. The instant process may be readily adapted to either a continuous or a semi-continuous operation to produce resultant tempered glass sheets having an abraded resistance to fracture by stress of the order of 5,000 to 40,000 pounds per square inch and a central tensile stress of the order of 2,500 to 20,000 pounds per square inch.

The edge surfaces of the glass to which the frit is applied may be treated by grinding to seam them if desired. The edge surfaces when so treated are typically ground with a diamond grit wheel and finish ground using a belt grinder. If desired however, the frit can be applied to the new cut, edge surfaces of glass sheets without any seaming by grinding and glass successfully tempered using a liquid quenching medium, when small sheets are treated.

The following examples are illustrative of the practice of the instant invention in tempering glass sheet. Examples 1–4 use glass edge protecting compositions having a lower thermal expansion coefficient than glass, while compositions with lower coefficients of heat transmission provide edge protection in the other examples.

EXAMPLE 1

A soda-lime glass sheet 16 inches by 42 inches by 0.090 inch was edge seamed using a diamond grit grinding wheel. The edges were then wet belted with a 400 grit belt.

Glass frit composition particles all below 325 mesh in size having the chemical composition listed in Table 1 and carried in a pine oil vehicle were applied to the edge surfaces of the glass sheet after the wet belting. The glass after having all edge surfaces coated with the frit composition was heated to a temperature of 1230°F. Upon attaining this temperature the glass was shock chilled by dipping it in a quenching liquid composed of a polyoxyalkylene oxide designated as UCON HB 5100 manufactured by Union Carbide Corporation. The quenching liquid before immersion was at a temperature of 350°F. The treated glass sheet did not break on immersion and subsequent observation of the cooled glass showed it to be tempered.

TABLE I

Frit Composition

| | Wt.% |
|---|---|
| $SiO_2$ | 18.52 |
| $Al_2O_3$ | 40.08 |
| $Cr_2O_3$ | 4.52 |
| PbO | 35.04 |

EXAMPLE 2

Using the frit composition of Table II with all particles below 325 mesh and carried in a pine oil carrier the edge surfaces of a soda-lime glass sheet 12 inches by 12 inches by ⅛ inch which had not been seamed as in Example 1 were coated completely with the frit. The glass was then heated to a temperature of 1220°F. and upon attaining that temperature was then completely immersed in a UCON HB 2000 quenching liquid. The UCON HB 2000 was a polyoxyalkylene oxide mixture manufactured by the Union Carbide Corporation. The quenching liquid had a temperature of 120°F. when the glass was admitted thereto. The cooled glass sheet removed from the quench was found to possess a satisfactory degree of temper with no signs of thermal shattering present.

TABLE II

Frit Composition

| | Wt.% |
|---|---|
| $SiO_2$ | 35.8 |
| $Al_2O_3$ | 3.9 |
| $Li_2O$ | 3.6 |
| $Pb_2O$ | 49.6 |
| $B_2O_3$ | 4.7 |
| $Cr_2O_3$ | 0.8 |
| $Co_3O_4$ | 1.6 |

EXAMPLE 3

A soda-lime glass sheet 12 inches by 12 inches by ⅛ inch was edge seamed using a diamond grit grinding wheel. The edges were then wet belted with a 400 grit belt.

Using the frit composition of Table III with the frit particles being below 325 mesh and carried in a pine oil vehicle, the edge surfaces of the soda-lime glass sheet after wet belting were coated completely with the frit. The glass was then heated to a temperature of 1230°F. Upon reaching this temperature the glass was immersed in a UCON HB 5100 quenching bath which was at a temperature of about 120°F. UCON HB 5100 is a polyoxyalkylene oxide manufactured by Union Carbide Corporation. The cooled glass sheet after removal is found to be satisfactorily tempered and shows no signs of thermal shatter.

TABLE III

Frit Composition

| | Wt.% |
|---|---|
| $SiO_2$ | 36.87 |
| $Al_2O_3$ | 3.94 |
| $Li_2O$ | 3.64 |
| PbO | 50.71 |
| $B_2O_3$ | 4.85 |

While the process has been described specifically with reference to substantially flat glass sheets, it is equally applicable to bent or curved glass such as windshields, curved window glass and the like. For example, the frit composition of Example 1 has been applied to prebent 0.090 inch thick windshield glass and the glass has been successfully tempered in a polyoxylakylene glycol liquid quench without shattering.

EXAMPLE 4

The processes recited in Examples 1 to 3 were followed using the frit composition of Table 1 as an edge protective composition applied to the leading edge portion comprising its leading edge surface and 4 to 5 inches along the side edge surface extending away from the leading edge of a pattern for a Volkswagen windshield approximately 16 inches by 42 inches by 0.090 inch and a pattern for a windshield for a Fisher Body approximately 24 inches by 58 inches by 0.090 inch. In each instance, the glass after being coated along the leading edge portion as recited hereinbefore was heated to a temperature of approximately 1230°F. Immediately upon attaining this temperature, the glass was first shaped by press bending to a desired windshield pattern nd shock-chilled by dipping it in the quenching liquid recited in Example 1 at a temperature of 350°F. to 450°F. The treated glass sheets did not break on immersion and inspection of the sheets after cooling showed that they developed a temper.

EXAMPLE 5

Additional samples of the windshield patterns of the types that were treated by a ceramic frit in Example 4 were treated along the leading edge surface and 4 to 5 inches of the leading portion of the side edge surfaces in a direction away from the leading edge surface with a composition obtainable commercially as Sauereisen No. 1 Cement Paste. This composition has a coefficient of heat conductivity that is less than that of glsss. An analysis of the Sauereisen No. 1 Cement Paste is contained in Table 4.

After applying the protective composition (Sauereisen No. 1 Cement Paste) to the leading edge portion of the glass sheet, the glass was heated to a temperature of approximately 1230°F. and then immediately quenched in a bath of UCON 75 H 90,000, a more viscous polyoxyalkylene oxide than UCON HB 5100, maintained at a temperature of between 380°F. and 385°F. The cooled glass sheets after removal were found to be satisfactorily tempered and showed no sign of thermal breakage.

TABLE 4

ANALYSIS OF SAUEREISEN NO. 1 CEMENT PASTE

Wet Chemical Analysis

| Ingredient | Weight % |
|---|---|
| $SiO_2$ | 76.12 |
| $Al_2O_3$ | 0.103 |
| $Fe_2$ | 0.4 |
| ZnO | 0.29 |
| Loss on Ignition | 22.03 |

Qualitative Emission Spectrograph Analysis

| Major Ingredent | Si |
|---|---|
| Minor Ingredients | Zn, Al, Fe |
| Trace to Minor | Zr, Li, Sn |
| Trace | Ca, Mg, Pb, Cr, Mn, Ni, Ag, Ou |

(Note: The presence of Zn interferes with the dtection and estimation of Na)

EXAMPLE 6

Glass sheets having the same dimensions as those treated in Example 5 were treated in the same manner as the samples treated in Example 5 except that the leading edge portions including the 4 to 5 inches along the side edge surface disposed adjacent the leading edge were initially treated with a coating of a paste of finely divided cerium oxide and water before the samples were heated and quenched and others were treated around the entire edge surface with the cerium oxide paste. The treated sheets were immersed in UCON 75 H 90,000 at a temperature between 350°F. and 400°F. after said heating. The cooled glass sheets after removal were found to be satisfactorily tempered and showed no sign of thermal breakage.

Thus, while the invention has been described with reference to certain specific embodiments, it is not intended that it be limited thereby except insofar as appears in the accompanying claims.

I claim:

1. A method of quenching heated flat glass to provide tempered glass comprising applying to at least the peripheral surface of at least one edge of the glass prior to heating to a temperature near its softening point a composition capable of fusing or adhering to glass on exposure to a temperature above the strain point of the glass to form an edge protective coating while maintaining the major surfaces of said glass sheet inwardly of each of said surfaces on or adjacent said peripheral edge thereof substantially free of said coating, said coating being applied in sufficient amount to inhibit the establishment in said edge of tension stress sufficient to make the glass susceptible to breakage during said quenching, heating the glass with said composition applied to each said surface on or adjacent each said peripheral edge and subsequently quenching the glass in a liquid quenching medium.

2. A method of quenching heated flat glass to provide tempered flat glass according to the method of claim 1, comprising applying to at least the peripheral surface of at least one edge of the glass prior to heating a frit having a low melting point and a coefficient of thermal expansion of approximately $7.6 \times 10^{-6}$ per degree centigrade or less, heating the glass and subsequently quenching the heated glass in a liquid quenching medium.

3. A method of tempering flat glass according to the method of claim 1, comprising applying to at least the peripheral surface of at least one edge of the flat glass a low melting frit having a coefficient of thermal expansion of approximately $6.8 \times 10^{-6}$ per degree Centigrade or lower, heating the glass to near its softening point and quenching the glass so heated by contacting it with a liquid heat transfer fluid to rapidly chill the glass to a temperature below its strain point.

4. The method of claim 1 wherein the quenching liquid is taken from the group consisting of oxyalkylene polymers, silicones, hydrocarbon oils and mixtures thereof.

5. The method of claim 1, wherein the glass is heated to temperatures above its strain point and near its softening point and is chilled during quenching to temperatures below the strain point.

6. The method of claim 2 wherein the frit has on a weight percent basis the composition:
$SiO_2$ 33.8
$Al_2O_3$ 3.61
$Li_2O$ 3.34
PbO 46.50
$B_2O_3$ 4.45
$Na_2O$ 8.30

7. The method of claim 2 wherein the frit has on a weight percent basis the composition:
$SiO_2$ 18.52
$Al_2O_3$ 40.08
$Cr_2O_3$ 4.52
PbO 35.04

8. The method of claim 2 wherein the frit has on a weight percent basis the composition:
$SiO_2$ 36.87
$Al_2O_3$ 3.94
$Li_2O$ 3.64
PbO 50.71
$B_2O_3$ 4.85

9. The method of claim 3 wherein the frit has a coefficient of thermal expansion of approximately $6.8 \times 10^{-6}$.

10. The method of claim 3 wherein the liquid heat transfer fluid is taken from the group consisting of silicones, oxyalkylene oxides, oxyalkylene glycols, hydrocarbon oils and mixtures thereof.

11. The method of claim 1, wherein the liquid quenching medium is at temperature of between about 200°F. to about 450°F.

12. The method of claim 1 wherein the composition applied to the glass edge surface is taken from the group of compositions having a heat transfer coefficient not greater than that of glass.

13. The method of claim 1, wherein said composition is taken from the group of compositions consisting of dispersions or pastes of one or more pulverulent materials taken from the class consisting of lime, magnesia, magnesium carbonate, mica, calcium sulfate, silica, chalk, diatomaceous earth, lamp black and cerium oxide.

14. The method of claim 1, wherein the composition applied to the glass edge surface is taken from the group of compositions having a low coefficient of thermal expansion compared to glass.

15. The method of claim 4, wherein said composition is a glassy frit having a melting point less than that of said flat glass.

* * * * *